United States Patent Office 3,600,359
Patented Aug. 17, 1971

3,600,359
NOVEL THIOURETHANE-URETHANE
ACRYLATES
Thomas J. Miranda, Granger, Ind., assignor to The
O'Brien Corporation, South Bend, Ind.
No Drawing. Filed Nov. 21, 1968, Ser. No. 777,914
Int. Cl. C08g 22/04
U.S. Cl. 260—77.5    18 Claims

ABSTRACT OF THE DISCLOSURE

A radiation curable compound is produced by reacting a polymercapto compound, a stoichiometric excess of a polyisocyanate (determined on the basis of the mercapto groups) and a hydroxy acrylate.

The present invention relates to radiation curable acrylic esters containing sulfur molecules, and to methods of making such esters. More specifically, the present invention is directed to radiation curable thiourethane-urethane acrylates which are curable using relatively low dosages of radiation. The novel acrylic esters contemplated by the present invention have a variety of applications in the coating and related fields.

In the coating industry there is a need for a variety of functional polymeric material which can be used for vehicles in coatings on metal, wood, paper, plastics, and related substrates. There is also a need in the plastics field for a reactive plasticizer in the use of vinyl plastisols and organosols as well as in the electrical field for encapsulants and potting compounds. In particular, there is a need for such materials which may be cured at low temperatures by a process such as radiation curing.

In the field of electron curing, there is a need to obtain high cures at low doses and at low dose rates. The dose is generally defined in terms of the "rad." The rad is the energy absorbed per unit mass and is equal to 1000 ergs per gram. The megarad is one million rads. As an example, in the curing of organic coatings which are radiation sensitive, such as those known to the art, a dose rate of from 15 to 20 mrad is generally required. Some coating systems require dose rates approaching 50 mrad. In terms of line speed for wood finishing applications or paper, or other assembly line operations, the dose rate of 10 mrads is equivalent to a line speed of about 10 feet per minute.

Although the prior art has suggested that certain sulfur containing acrylate copolymers are deficient in their resistance to alkali (see U.S. Pat. 3,245,941), the present invention provides sulfur containing acrylate based polymers which are highly alkali resistant.

It is the purpose of this invention to produce coating compositions which can be completely cured by lower doses of radiation. By the use of the sulfur containing acrylates of this invention, dose rates as low as 1 mrad in air can be obtained, which in terms of line speed, would be 50 feet per minute, or a tenfold increase.

While the products of this invention can be cured by ionizing radiation, the scope of the invention does not so limit them, for they can also be cured by heating with a catalyst such as benzoyl peroxide, azobis isobutyronitrile (AIBN), t-butyl hydroperoxide, ditertiary butyl peroxide, dicumyl peroxide, the percarbonate initiators and other free radical sources. In addition to the use of free radical sources, the combination of free radicals and metals such as cobalt, manganese, or other accelerators such as amines can be used so that curing can be accomplished in the absence of radiation at high speeds and low room temperatures.

The novel acrylate esters of the present invention are acrylate terminated compounds containing a plurality of intermediate urethane groups and a plurality of intermediate thiourethane groups. The novel radiation curable acrylate esters of the present invention may be prepared by first preparing, as an intermediate, a thiourethane containing at least one reactive isocyanate group. Such intermediates may be prepared by reacting a polyisocyanate with a polymercapto compound. The reactive isocyanate group of the intermediate may be then reacted with a hydroxyfunctional acrylate monomer to form the radiation curable mercaptate esters. Generally, the preferred process for producing the radiation curable compositions is shown by the following reactions:

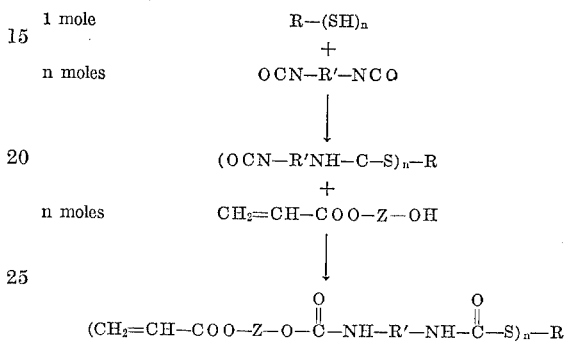

Thus, it can be seen that the novel acrylates of the present invention contain both thiourethane and normal urethane or oxyurethane groups, in addition to the acrylate terminal groups.

The first step in the preferred embodiment is the preparation of the intermediate, which is prepared by reacting a compound containing at least one reactable mercapto group with a stoichiometric excess of a polyisocyanate. Preferably, sufficient isocyanate is used to provide about two isocyanate groups for each mercapto group. By such a reaction, the NCO-functional thiourethanes are formed as follows:

It is preferred to use a polymercapto ester, wherein $n$ is more than 1 and wherein R′ contains ester groups, whereby the resulting compound will be a polythiourethane.

It is essential that all of the mercapto groups be reacted to improve water and alkali resistance. Since it is desired to produce an intermediate which contains unreacted isocyanate groups, it is generally preferred to use excess isocyanate. A suitable means of achieving this is to use a diisocyante in which the isocyanate groups have different orders of reactivity, such as 2,4-toluene diisocyanate. The para isocyanate is about 10 times more reactive than the ortho isocyanate, which permits a reaction at para position while leaving a free isocyanate group at the ortho position. For example, in the case of a mercapto ester containing 3 mercapto groups, 1 mole of mercapto ester would be reacted with 3 moles of toluene diisocyanate. Generally, the order of addition can be ester to isocyanate but for the practice of this invention the reverse is employed. The temperature range for the reaction between the isocyanate and the mercapto should be kept in the range of 20–70° C., in order to prevent side reaction.

After the intermediate is produced, a hydroxy acrylate is added to the intermediate in amounts sufficient to insure the complete reaction of the residual NCO. It is preferred to use an excess of about 5–20% of the acrylate, but about 10% seems to be optimum.

Alternately, for improving adhesion to various susceptible substrates, less than stoichiometric amounts of hydroxy acrylates can be used. The resulting free isocyanate groups react with many substrates and impart improved adhesion. The range of free isocyanate can be from about 0.1 to 1 mole percent.

During the hydroxyl addition the temperature is preferably held between 25 and 35° C. until all of the hydroxy acrylate has been added. The temperature may then be raised to as high as 80° C. for up to about 30 minutes in the final step until the NCO value is below 1.0. The temperature range for holding the final reaction is preferably between about 50–80° C., but not above 80° C. since side reactions can occur.

Broadly, the present invention contemplates using any low molecular weight organic compounds which contain a plurality of mercapto groups as the source of the sulfur for the radiation curable compounds. For instance, aliphatic dithiols such as 1,2-ethanedithiol or the homologs thereof can be used. Although the higher molecular weight (over about 1200) polymercapto compounds can be used, the resulting curable compositions have high viscosities which makes them undesirable for many applications.

The curable compositions of this invention are preferably based on polymercapto esters generally produced by reacting lower alkyl mercapto acids of the formula HS—R—COOH, wherein R may contain up to about 6 carbon atoms, with a low molecular weight polyol. Suitable polyols include trimethylol ethane, trimethylol propane, glycerine, pentaerythritol, and the like. Suitable mercapto esters include: trimethylolpropane tris(thioglycolate); trimethylolpropane tris(mercaptopropionate); pentaerythritol tetrakis(thioglycolate); pentaerythritol tetrakis(mercaptopropionate); and the like. Mixtures of these and similar mercapto compounds also may be used. These mercapto esters generally have the following formula:

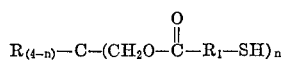

wherein R is a lower alkyl radical having up to 8 carbon atoms such as H, $CH_3$, $C_2H_5$, $C_6H_5$, or the like, and $R_1$ is a lower alkylene radical of up to 8 carbon atoms such as CH, $(CH_2)n$, $C_6H_4$, or the like and $n=2$, 3, or 4. Although mono-mercapto esters can be reacted, the products are not true polymers.

The polythiourethane intermediates of this invention may be prepared by reacting an appropriate mercapto compound with an excess of a polyisocyanate of the type shown structurally below:

OCN—R—NCO wherein R may be aromatic, aliphatic or cycloaliphatic such as phenyl, tolyl, naphthyl, polymethylene, etc. Representative isocyanates which may be used include:

2,4-toluene diisocyanate
2,6-toluene diisocyanate
naphthalene diisocyanate
methaxylene diisocyanate
diphenyl methane diisocyanate
cumene 2,4-diisocyanate
4-methoxy-1,3-phenylene diisocyanate
4-chloro-1,3-phenylene diisocyanate
2,4'-diisocyanato diphenyl ether
5,6-dimethyl-1,3-phenylene diisocyanate
4,4'-diisocyanato diphenyl ether
benzidine diisocyanate
4,4'-diisocyanato dibenzyl
2,4-diisocyanatostilbene
3,3'-dimethyl-4,4'-diisocyanato phenyl methane
1,4-anthracene diisocyanate
2,5-fluorene diisocyanate
2,6-diisocyanato benzfuran
amyl benzene-2,4-diisocyanate
hexyl benzene-2,4-diisocyanate
polymethylene diisocyanates, such as tetramethylene diisocyanate, pentamethylene diisocyanate, hexamethylene diisocyanate cycloalkylene diisocyanates, such as cyclohexylene-1,4-diisocyanate
hetero chain diisocyanates, such as

lysine diisocyanate

In addition to the simple diisocyanates described above, and mixtures thereof, polyisocyanates having a functionality of 3 or more may also be used. Such polyisocyanates may be produced, for instance, by reacting a diisocyanate such as toluene diisocyanate with a polyol such as trimethylol propane. The resulting intermediate has free isocyanate groups which are subsequently reacted with a hydroxyfunctional acrylate compound of the following structural formula:

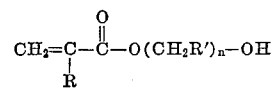

wherein R is hydrogen, methyl or ethyl, and R' is lower alkylene containing up to about 8 carbon atoms, The (CHR') group may be so arranged that the hydroxy group forms either a primary, secondary or tertiary alcohol. The primary alcohols are preferred because they are most reactive while the tertiary alcohols are least reactive. Suitable hydroxy acrylates include: 2-hydroxyethyl acrylate, 2-hydroxyethyl methacrylate, 6-hydroxyhexyl acrylate, hydroxpropyl acrylate, polyether adducts of acrylic and methacrylic acid and the like. Mixtures of these acrylates also can be used.

In the preparation of the compositions of the present invention, and particularly in preparing the polythiourethane intermediates, it is important to avoid the presence of moisture, or other materials containing active hydrogen groups which may react with the available isocyanates. For this reason, if a solvent is to be used, anhydrous solvents, such as those designated "polyurethane grade" solvents, are preferably used.

Generally, the compositions of this invention are prepared in conventional equipment, including either glassware or stainless steel, using an agitator, condenser, means for heating and cooling, preferably a water bath, and an inert gas inlet. The preparation of the compositions of the present invention can advantageously be carried out in the absence of catalysts, although catalysts can be used. Catalysts suitable for use in the preparation of the compositions of this invention include metal salts of cobalt, and manganese, the organo phosphates such as tributyl phosphonium chloride, the tin compounds including dibutyl tin diacetate, dibutyl tin dilaurate, and stannous octoate. If used, from about 0.01 to about 5% by weight of catalysts are useful. The resulting compositions can then be used as such, but generally they are thermoplastic materials, that can be reduced by a variety of solvents including esters, ketones, glycol ethers, and solvents used in the coating industry.

A particularly useful class of solvents which can be used for the reduction of the polymer compositions of this invention includes ethylenically unsaturated monomers including the esters of acrylic and methacrylic acid, polyfunctional acrylates such as trimethylolpropane triacrylate, styrene, vinyl toluene chloro styrene, vinyl pyrrolidone, vinyl acetate, t-butyl styrene, octyl styrene, vinyl versatate, hexachlorobutadiene, and the like. The incorporation of monomers as solvents yields, in effect, a polymerization system which is essentially 100% convertible. This is of good value in the preparation of coatings which lead to reduction in air pollution due to the volatile content. The loss of solvent can be reduced resulting in greater savings to the coating applicator. Retention of solvent in the final coating is reduced so that these materials can be used in coatings for food containers.

The compositions of this invention can also be pigmented with a variety of white or colored pigments to obtain coatings suitable for a variety of applications. Clear and pigmented coatings have shown to have good exterior durability.

The following examples will serve to illustrate the preparation of several curable mercaptate esters within the present invention, but it is understood that these examples are set forth merely for illustrative purposes and many other curable mercaptate esters are within the scope of the present invention.

EXAMPLE 1

To a three neck flask equipped with stirrer, condenser, inert gas outlet was added 78 grams of trimethylolpropane tris(mercaptopropionate) (0.196 mole). Stirring was begun and 130 grams of toluene diisocyanate (0.75 mole) was added over a 45 minute period, keeping the temperature 25° C. At the end of the addition, the flask was heated to 70° C. for 30 minutes at which time the temperature adjusted to between 35° and 45° C. and 121 grams of 2-hydroxyethyl acrylate (1.04 moles) was added drop-wise. Upon completion of the addition of the hydroxyethyl acrylate, 50 grams of ethyl acetate (solvent) was added, the flask heated to 70° for 30 minutes and then cooled. The resulting composition was clear and viscous.

The viscous clear vehicle was drawn down on wood, radiated at 10 mrads and cured to a hard, solvent free film. To determine whether lower doses could be obtained the radiation was repeated on another sample and the dose lowered to 0.75 mrads in air and the coating was cured to a hard solvent resistant film. Solvent resistance is determined by rubbing an acetone soaked cloth across the coating 50 times. If no solvent attack is noted the coating is considered to pass. By contrast a vinyl organosol prepared by conventional means is completely removed by acetone rubbing. The coating was resistant to 10% alkali. (24 hours). Samples were prepared and cured at 1 mrad on wood and metal and exposed in Florida for six months and compared against conventional clear urethane varnish. At the end of six months, the coatings had high gloss, very slight chalking and good appearance.

EXAMPLE 2

The resin of Example 1 was reduced as follows:

100 parts of the resin was thinned with 20 parts of vinyl pyrrolidone. The clear solution was drawn down (3 mil film) on wood and subjected to 1.5 mrad and 3.0 mrad doses respectively in air. The coatings cured to hard tack free film which were solvent resistant.

EXAMPLE 3

Into the equipment described in Example 1 was charged 137 grams of trimethylolpropanol tris(thioglycolate), (0.260 mole). Temperature was maintained at 25° C. and 274.81 grams of toluene diisocyanate (1.55 moles) was added over a 30 minutes period after which time the temperature was increased to 70° C. and held for 30 minutes. The temperature was then lowered to 45° and 254.5 grams of 2-hydroxyethyl acrylate (2.19 moles) was added over a 1 hour period. At the end of the addition of the hydroxyethyl acrylate, the temperature was increased to 70°, held for 30 minutes. The resulting resin was cooled and then thinned with 66.68 grams of ethyl acetate. The thin, clear, viscous material was drawn down on wood at 3 mils and given a 10 mrad dose under the electron beam and cured to a hard, tack free surface. Samples were also drawn down at the same thickness and given 5 and 1 mrad dose respectively in each case cured to a hard, tack free solvent resistant film.

EXAMPLE 4

In the equipment of Example 1 was added 109 grams of pentaerythritol tetrakis(thioglycolate) (0.248 mole). The temperature was maintained at 25° and 216 grams of toluene diisocyanate (1.25 moles) was added over a 1 hour period. Then, heating was applied for 30 minutes at a temperature of 70°. The heat was removed and the flask cooled to room temperature at which point 200 grams of hydroxyethyl acrylate (1.725 moles) was added dropwise over a 45 minute period. Extensive cooling was required as the temperature rose to 65°. After the addition of the hydroxyethyl acrylate, the flask was cooled to room temperature and thinned with 50 grams of ethyl acetate. The product was a heavy viscous material which could be drawn down on wood with a Bird applicator and was radiated at 1, 5, and 10 mrads to yield tack free, hard, glossy coatings with good solvent resistance. The composition of the example was reduced with equal parts of the following solvents:

vinyl pyrrolidone
butyl acrylate
2-hydroxyethyl acrylate

The resulting solutions were then cast on wood and metal panels and given doses of 5 and 15 mrads and cured to hard tack free film having good solvent resistance.

EXAMPLE 5

Into the equipment of the previous example was charged 244 grams of pentaerythritol tetrakis(mercaptopropionate) (0.455 mole) and 80.4 grams of ethyl acetate was added to facilitate stirring. The temperature was held below 30° and 348 grams of toluene diisocyanate (1.98 moles) was added over a 30 minute period. The temperature was then raised to 70°, held for 30 minutes and cooled again to below 50° C. At that point, 232 grams of 2-hydroxyethyl acrylate (2.00 moles) was added over a 1 hour period and the temperature maintained below 50° with a water bath. The temperature was allowed to remain at 50° for 30 minutes after the addition of the hydroxyethyl acrylate, then the reaction product was cooled with an additional 90 grams of hydroxyethyl acrylate (0.775 mole) and 20 grams of ethyl acetate was added to the flask. The clear viscous resin was cast on wood and steel at 3 mils and given radiation doses of 1, 5, and 10 mrads. In all cases a tack free film was obtained which was not attacked by acetone. In order to prepare useful coatings, the resin of this example was thinned with vinyl pyrrolidone and butyl acrylate 50 grams of each monomer added to 50 grams of the resin and the films were cast and radiated as before and clear tack free films were obtained.

Although the preferred process for making the compositions of the present invention, as illustrated in the foregoing examples is based on first reacting the polyisocyanate with the polymercapto compound, followed by reaction with the hydroxy acrylate, the present invention also contemplates the reverse process. In other words, the acrylate may first be reacted with the polyisocyanate, and then the polymercapto compound reacted therewith.

The product of this invention may be used alone, or can be combined with a variety of other polymers, including certain alkyds thermosetting acrylics, vinyl, phenolics, polyurethanes, epoxys, other radiation sensitive compositions, and related vehicles known to the art.

The radiation curable compositions of the present invention may be used in many applications, with or without pigments, and with or without solvents. Preferably the compositions are used with polymerizable solvents described above. These compositions may be used as either decorative or protective coatings for wood, metal, paper and the like, and may be used as adhesvies or plotting compositions. The compositions of the present invention are particularly useful as coatings for exterior sidings and for ceiling tiles.

Although the invention has been described in considerable detail in the foregoing specification, it is understood that such detail is solely for the purpose of illustration and that many variations can be made by those skilled in the art without departing from the spirit and scope of the invention as defined in the following claims.

What is claimed is:

1. A radiation curable composition having terminal acrylate groups which is the reaction product of (A) a polymercapto compound, (B) a stoichiometric excess of a polyisocyanate, said excess being determined by the number of mercapto groups present, and (C) a hydroxyacrylate.

2. A radiation curable composition as described in claim 1, wherein said polymercapto compound is a polymercapto ester of the formula:

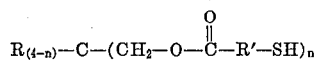

wherein R is hydrogen or an alkyl group of up to 8 carbon atoms, R' is an alkylene group of up to 8 carbon atoms and $n$ is equal to 2, 3 or 4.

3. A radiation curable composition as described in claim 1, wherein sufficient polyisocyanate is used to provide about 2 equivalents of isocyanate for each equivalent of mercapto provided by said polymercapto.

4. A radiation curable composition as described in claim 2, wherein sufficient polyisocyanate is used to provide about 2 equivalents of isocyanate for each equivalent of mercapto provided by said polymercapto.

5. A radiation curable composition as described in claim 1, wherein said hydroxyacrylate has the formula:

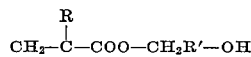

wherein R is hydrogen, methyl or ethyl; and R' is an alkylene group containing up to about 8 carbon atoms.

6. A radiation curable composition as described in claim 2, wherein said hydroxyacrylate has the formula:

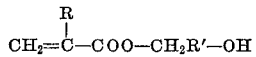

wherein R is hydrogen, methyl or ethyl; and R' is an alkylene group containing up to about 8 carbon atoms.

7. A radiation curable composition as described in claim 3, wherein said hydroxyacrylate has the formula:

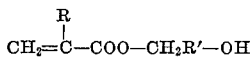

wherein R is hydrogen, methyl or ethyl; and R' is an alkylent group containing up to about 8 carbon atoms.

8. A radiation curable composition which comprises the reaction product of (A) a polythiourethane which is the reaction product of a polymercapto compound and a stoichiometric excess of a polyisocyanate and (B) a hydroxyacrylate.

9. A radiation curable coating composition which comprises the reaction product of (A) a polythiourethane intermediate and (B) a hydroxyfunctional acrylate, wherein said intermediate is the reaction product of a polymercapto ester and a stoichiometric excess of a polyisocyanate.

10. A radiation curable composition as described in claim 9 wherein the polyisocyanate is 2,4-toluene diisocyanate and the hydroxyfunctional acrylate is 2-hydroxyethyl acrylate.

11. A method of preparing a radiation curable composition which comprises the first step of reacting a polymercapto compound with a stoichiometric excess of a polyisocyanate, followed by the second step of reacting a hydroxyacrylate with the product of the first reaction step.

12. A method as described in claim 11, wherein said polymercapto compound is a polymercapto ester of the formula:

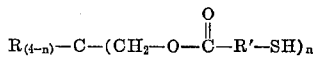

wherein R is hydrogen or an alkyl group of up to 8 carbon atoms, R' is an alkylene group of up to 8 carbon atoms and $n$ is equal to 2, 3 or 4.

13. A method as described in claim 11, wherein said hydroxyacrylate has the formula:

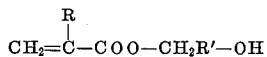

wherein R is hydrogen, methyl or ethyl; and R' is an alkylene group containing up to about 8 carbon atoms.

14. A method as described in claim 12, wherein said hydroxyacrylate has the formula:

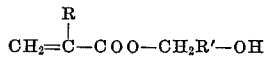

wherein R is hydrogen, methyl or ethyl; and R' is an alkylene group containing up to about 8 carbon atoms.

15. A method as described in claim 11, wherein said reactions are carried out at temperatures below 80° C.

16. A method as described in claim 14, wherein said reactions are carried out at from about 20° C. to about 70° C.

17. A method as described in claim 14 wherein sufficient polyisocyanate is used in said first step to provide from about 2 to about 2.25 equivalents of isocyanate for each equivalent of mercapto provided by said polymercapto ester.

18. A method as described in claim 17, wherein the amount of hydroxyacrylate added to said second step reaction is sufficient to provide from about 75% to about 110% of the hydroxy equivalents necessary to react with the free isocyanate from the first step reaction.

References Cited

UNITED STATES PATENTS 3,284,415  11/1966  Horvath _____ 260—77.5

DONALD E. CZAJA, Primary Examiner

M. J. WELSH, Assistant Examiner

U.S. Cl. X.R.

117—62.2, 93.31, 132, 138.8, 148, 155; 204—159.16; 260—18, 30.2, 31.2, 31.6, 33.6, 33.8, 859

PO-1050
(5/69)

UNITED STATES PATENT OFFICE
CERTIFICATE OF CORRECTION

Patent No. 3,600,359   Dated August 17, 1971

Inventor(s) THOMAS J. MIRANDA

It is certified that error appears in the above-identified patent and that said Letters Patent are hereby corrected as shown below:

Column 2, line 64, "reaction" should be --reactions--

Column 4, line 23, "," should be -- . --.

Column 4, line 57, "incluing" should be --including--.

Column 6, line 12, "applicator" should be --Applicator--.

Column 6, line 22, "15" should be --10--.

Column 6, line 60, "vinyl" should be --vinyls--.

Column 6, line 69, "adhesvies" should be --adhesives--.

Column 6, line 69-70, "plotting" should be --potting--.

Column 7, claim 5, formula should be

Signed and sealed this 7th day of March 1972.

(SEAL)
Attest:

EDWARD M. FLETCHER, JR.
Attesting Officer

ROBERT GOTTSCHALK
Commissioner of Patents